US005551237A

United States Patent [19]
Johnson

[11] Patent Number: 5,551,237

[45] **Date of Patent: * Sep. 3, 1996**

[54] METHODS FOR PRODUCING HYDROELECTRIC POWER

[76] Inventor: Arthur F. Johnson, 240 Fox Dr., Boulder, Colo. 80303

[*] Notice: The portion of the term of this patent subsequent to Apr. 4, 2011, has been disclaimed.

[21] Appl. No.: 470,093

[22] Filed: Jun. 6, 1995

Related U.S. Application Data

[62] Division of Ser. No. 222,753, Apr. 4, 1994, Pat. No. 5,461, 858.

[51] Int. Cl.[6] .......... B60K 16/00; F03G 6/00; F16D 31/02

[52] U.S. Cl. .......... 60/641.8; 60/398; 126/672

[58] Field of Search .......... 60/641.8, 325, 60/398; 126/672, 670

[56] References Cited

U.S. PATENT DOCUMENTS

| | | | |
|---|---|---|---|
| 120,545 | 10/1871 | Stevens . | |
| 995,219 | 6/1911 | Bradley | 60/641.8 |
| 1,055,880 | 3/1913 | Coster . | |
| 1,275,503 | 8/1918 | Turner . | |
| 1,290,756 | 1/1919 | Kasley . | |
| 1,356,463 | 10/1920 | Okun | 60/325 |
| 2,239,893 | 4/1941 | Jackman, Jr. | 60/416 X |
| 2,258,167 | 10/1941 | Turner . | |
| 2,829,501 | 4/1958 | Walls | 60/659 |
| 3,490,996 | 1/1970 | Kelly, Jr. | 60/641.8 X |
| 3,611,723 | 10/1971 | Theis, Jr. | 60/416 X |
| 3,624,700 | 11/1971 | Schaeve et al. | 91/461 X |
| 3,688,502 | 9/1972 | Hansen . | |
| 3,722,365 | 9/1973 | Olsson | 91/445 X |
| 3,839,863 | 10/1974 | Frazier | 60/327 |
| 3,991,574 | 11/1976 | Frazier | 60/325 X |
| 3,995,428 | 12/1976 | Roberts . | |
| 4,010,614 | 3/1977 | Arthur | 60/398 X |
| 4,052,858 | 10/1977 | Jeppson . | |
| 4,068,476 | 1/1978 | Kelsey | 60/325 X |
| 4,070,861 | 1/1978 | Scragg et al. | 60/641.8 |
| 4,095,423 | 6/1978 | Gorlov . | |
| 4,095,428 | 6/1978 | Warren | 60/641.8 |
| 4,103,490 | 8/1978 | Gorlov . | |
| 4,201,049 | 5/1980 | Tobber | 60/325 |
| 4,206,608 | 6/1980 | Bell | 60/398 X |
| 4,246,888 | 1/1981 | Jarzenbeck, Sr. | 126/620 |
| 4,290,417 | 9/1981 | Peters et al. | 126/638 |
| 4,409,961 | 10/1983 | O'Hare | 60/641.8 X |
| 4,464,080 | 8/1984 | Gorlov . | |
| 4,471,617 | 9/1984 | De Beer | 60/641.8 X |
| 4,514,979 | 5/1985 | Mohr . | |
| 4,555,905 | 12/1985 | Endou | 60/659 |
| 4,739,620 | 4/1988 | Pierce | 60/641.8 |
| 5,074,710 | 12/1991 | Gorlov . | |
| 5,222,833 | 6/1993 | Gorlov . | |
| 5,419,135 | 5/1995 | Wiggs | 60/641.8 X |

FOREIGN PATENT DOCUMENTS

| | | | |
|---|---|---|---|
| 282773 | 7/1929 | United Kingdom | 60/641.8 |

OTHER PUBLICATIONS

*Hydraulic Turbines*, pp. 25–31.

Technology Review, "Hydropower That's Cleam and Green", pp. 13 and 14.

*Primary Examiner*—John E. Ryznic

[57] ABSTRACT

A process of converting steam to hydro-electric power through a process of allowing steam to displace water from a tank for operating a turbine or pelton wheel. The process allows hydro-electric power to be generated at a greatly increased efficiency. Preferably, two concrete, underground chambers are used to receive steam which exert pressure to displace the water. The process allows existing power plants to utilize excess steam to generate additional power, and thus greatly increase the overall efficiency of the plant. Solar energy heats the water to produce low pressure steam in a transparent enclosure, and further heats the vapor passing through transparent conduits leading into the underground chambers.

20 Claims, 4 Drawing Sheets

METHODS FOR PRODUCING HYDROELECTRIC POWER

CROSS-REFERENCE TO RELATED APPLICATIONS

This application is a division of application Ser. No. 08/222,753 filed Apr. 4, 1994 now U.S. Pat. No. 5,461,858.

TECHNICAL FIELD

The present invention relates to the production of hydroelectric power. More particularly, the present invention relates to the production of hydroelectric power through the use of steam and water.

BACKGROUND OF THE INVENTION

In order to produce electricity on a commercial scale, it is generally accepted that a rotating motor generator is necessary to rotate magnets around coils of wire. A generator is commonly rotated through impinging a gas such as steam against a wheel. A steam generator of this conventional type will only have an efficiency of 35 or perhaps 40 percent. Thus the steam driven electric generators result in a substantial waste of fossil fuels. No system has been developed to correct this enormous inefficiency and waste of fossil fuel resources which, of course, can not be replaced.

Many patents have been directed to produce power from steam or gas more efficiently, but all have lacked the simplicity of both design and construction to be adapted for safe use in modern power plants.

SUMMARY OF THE INVENTION

The present invention overcomes the problems in the prior art through a unique process that allows the production of hydro-electric power at greatly increased efficiency than was previously possible.

The object of the present invention is to produce hydroelectric power from the conversion of steam at high efficiency, through a method that can be adapted for existing power plants.

This object is achieved though a process of utilizing steam to displace water, which is then utilized to generate power through impingement of the water against a turbine wheel. The efficiency of water impingement in the hydro-electric generator of the present invention is on the order of 70 to 90 percent, as opposed to only 35 or 40 percent that is achieved with utilizing steam impingement.

The process of the present invention utilizes steam generated by existing power plants to generate additional power at a minimal cost and high efficiency. The process feeds steam from the power plant to a chamber preferably located under the ground. The chamber contains water, and has a floating light weight plate that separates the water from the steam in the chamber. When the steam enters the chamber, it places pressure on the plate, which forces the water out of the chamber though a duct. The duct leads to a turbine wheel, which the water impinges against, generating electricity. The water then returns to the chamber. A plurality of chambers can be provided for increased efficiency.

In a preferred embodiment of the present invention, steam is injected into a vertically mounted cylindrical tank of water on which floats a lightweight insulated disc. To provide strength for the tanks at low cost, they are preferably manufactured of reinforced concrete and buried under the ground. Most preferably, two tanks are used so that when the water is forced out of one tank to drive the hydro-electric generator, the other tank has been filled without pumping water. The water is protected from contamination so that it may be used as steam boiler feedwater of a power plant producing steam, and water filters may be used. This embodiment prevents heat loss and converts steam into hydro-electric power with a minimum of capital cost for apparatus, since complex steam generators and reheaters are avoided. In addition, the power of sunlight can also be used to aid in the expansion of steam, or an alternative fluid, utilizing the same process outlined above, with the chamber located above ground to receive sunlight.

DETAILED DESCRIPTION OF THE PREFERRED EMBODIMENT

Figure 1:
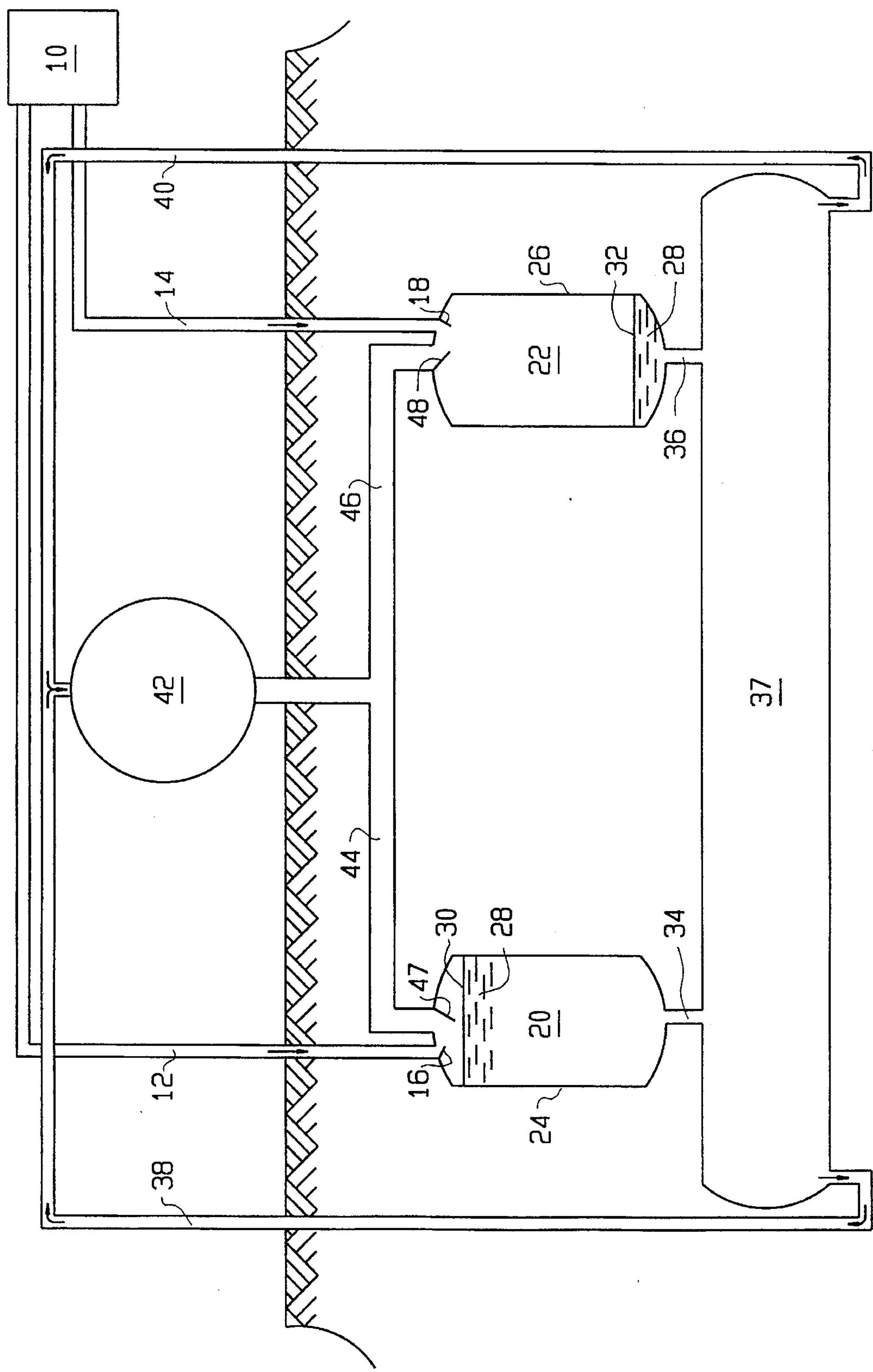
FIG. 1 is a cross-sectional view of the preferred embodiment of the present invention.

The present invention specifically relates to a process for converting steam to hydro-electric power by passing steam into the top of a first vertical cylindrical tank which is full of water; allowing the steam to displace the water and release the water from the tank through an aperture located near the base, which aperture has a relatively small area compared to the horizontal cross-sectional area of the tank; and directing the released water to operate a hydraulic turbine to generate power. The area of the tank should be between about 20 and 50 times the area of the aperture.

In this process, the tank includes a movable plate therein and the water is displaced by introducing the steam to displace the plate. Also, a second vertical cylindrical tank may be utilized in the same manner as the first tank so that one tank can be refilled with water while the other is releasing water. Each tank preferably includes a movable plate therein for displacing the water.

Advantageously, the hydraulic turbine is located at a higher elevation than the tanks and the water which exits the hydraulic turbine is directed back to one of the tanks while the other is receiving steam and displacing the water therein. Water released from the tanks can be directed to a reservoir prior to being directed to the turbine.

Another aspect of the invention relates to a process for generating hydro-electric power by producing steam in a power plant; feeding the steam into a vertical cylindrical tank of water which is provided with a light weight float; introducing the steam in a quantity sufficient to increase the pressure of the water and cause the water to exit the tank; and directing the exiting water to a hydroelectric apparatus for operation of same to generate power. The power producing device preferably produces direct current for charging one or more batteries. Also, the efficiency of the power plant can be increased by allowing the power plant to produce low pressure steam for feeding the tank.

Yet another embodiment relates to a process for producing hydro-electric power from vapor by providing water in an enclosure; exposing the enclosure to sunlight to heat the water and generate vapor; and removing the vapor from the enclosure to drive a power producing device. It is useful to add a vaporizable substance such as ethyl alcohol to the water to increase the generation of the vapor.

In this process, the enclosure should be made of a transparent material which allows entry of the sunlight. Also, conduits made of a transparent material and exposed to sunlight for additional heating of the vapor can be used to direct the vapor from the enclosure to the power producing device. The enclosure and the conduits may be corrugated on its outer surface to magnify the sunlight which passes therethrough. Alternatively, the conduits may be rollbonded sheets of metal having a serpentine path.

The practical value of this invention is that the apparatus utilizing the heat now lost in condensation which are the underground tanks and surface hydroelectric generator may be installed without much interference with the steam plant since pipe connections involve only low pressure steam. When the high pressure steam turbo-electric generators are worn out, this invention provides that only low pressure steam be produced to operate the hydroelectric generators by simply pumping a greater quantity of water through the boiler tubes but still maintaining high temperature combustion of fossil fuel. This results in higher rate of transfer from hot gas to cooler tubes. It is known that about 95% of the heat transfer in large combustion chambers is by radiation, so that it is important to evaluate the radiative power of the gas/fuel/flame media.

By use of this invention the production of electric power may be tripled without increase in quantity of fuel consumed. This has importance from standpoint of national security. The cost of producing electric power needed for subways and interurbans nation-wide is quickly reduced, and small hydroelectric units operating from hot water made feasible. Building roofs facing south can make water or water-alcohol mixtures hot enough to operate the electric generators of this invention.

The fallacy has been the use of about 800 tons water per ton of coal to condense low pressure steam, which steam this invention utilizes.

The preferred embodiment is shown in FIG. 1, wherein there is an existing steam power plant 10, with steam pipes 12, 14, leading away from the power plant 10. The pipes are provided with valves 16, 18 at the entrance of the pipes 12, 14 to the cylindrical chambers 20, 22, which are enclosed by reinforced concrete 24, 26. Light weight vermiculite concrete is advantageously used, as it retains little heat.

Inside the chambers 20, 22, there is water 28, and lightweight floats 30, 32 preferably made of fiberglass. The floats 30, 32 keep the steam from blowing directly into the water 28 and wasting the pressure of the steam. As shown in FIG. 1, when float 30 is near the bottom of its stroke, float 32 will be near the top of its stroke so that a high pressure stream of water will flow through ducts 34, 36. Preferably a reinforced high pressure water storage tank 37 is provided. From the tank 37, the water flows through pipes 38, 40. The stream of water will act upon a pelton wheel 42 or any acceptable turbine. The pelton wheel 42 is preferably provided with a rotor and buckets. The stream of water rotates electric generators, and once spent flows down ducts 44, 46 back into chambers 20, 22, through valves 47, 48.

It is also incorporated into this disclosure that the tanks could be not cylindrical, but could be of square cross section, but obviously cylindrical would be the most efficient.

Figure 2:
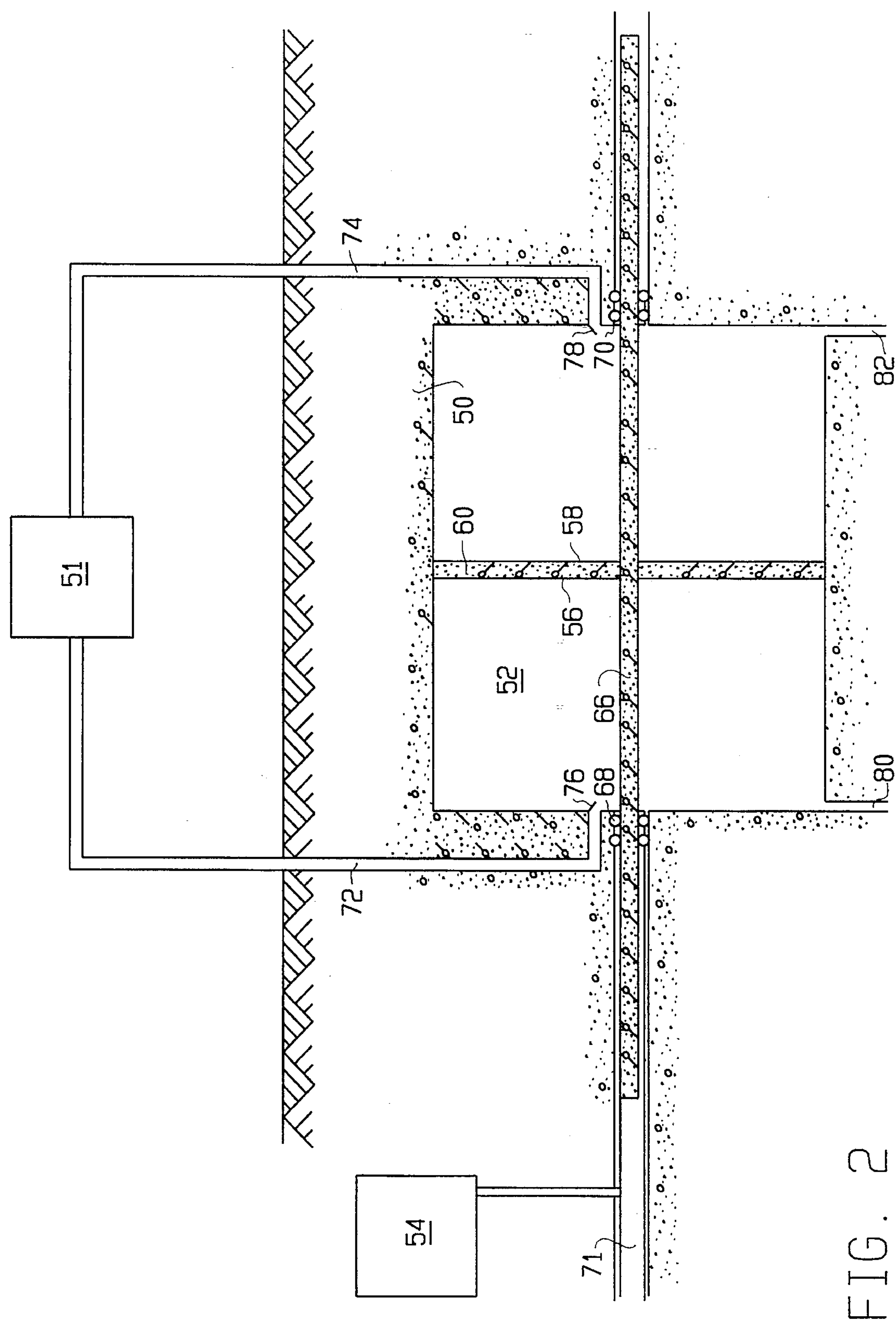
FIG. 2 is a cross-sectional view of an alternative embodiment of the present invention.

In an alternative embodiment of the invention, as shown in FIG. 2, another structure is provided for improving the efficiency of existing steam power plants. FIG. 2 is a cross section of the apparatus utilized in the process of the invention. A reinforced concrete structure 50 is provided under the earth surface, located near an existing power plant 51. Subsurface construction allows mechanical reenforcing of tamped earth around the pipes and heat savings since earth, when kept dry is a good heat insulating material. There is a cylindrical space 52 wherein steam is expanded to pump water to the hydroelectric generator 54.

To build a reinforced concrete tank of, for example, 10 feet in diameter that would withstand steam pressure of 5 psia would not have been possible until prestressed steel wire embedding in the concrete was developed. Prestressing compresses the concrete, which in effect increases the concrete tensile strength available to withstand pressure. It effectively utilizes high-strength steel so that under a given loading condition, less concrete and steel are required, making it more economical than old conventional concrete pipe. There are two circular plates 56, 58, which can be made of stainless steel, which retain a light weight heat resistant concrete plate 60, which can be provided with grooves that can be filled with heat resistant packing such as Teflon or graphitized asbestos.

There is further provided a stainless steel shaft 66, to which the plates 56, 58 are securely attached by welding or the like. Large roller bearings 68, 70 are provided to support the piston rod and assembly. Water 71 will be pumped with a pressure equal to the face area of the piston divided by the area of the shaft end area. Therefore, if the piston face is 100 feet * pi (3.14)=314 square feet, and the piston rod is 0.25 feet * pi (3.14) or 0.74 square feet, the ratio is about 400 to 1. In operation, steam exerting a pressure of 15 psia exerts a pressure of the water of 6,000 psi, which would lift water to a height of (6,000 * 14.7/32)=2,756 feet, suitable for a hydroelectric plant that uses impulse wheels to obtain 85 percent efficiency. Stainless steel ducts 72, 74 are also provided for the introduction of steam via the steam valves 76, 78 alternately into first one side of the piston and then the other. Ducts 80, 82 are also provided for draining hot water of condensation to the boiler feed pumps of a steam power plant.

By this simple means and relatively inexpensive apparatus compared to conventional steam turbines now used in electric power plants it is made possible doubling the capacity for producing electricity without an increase in the amount of fossil fuel in the power plant.

The capital cost of the apparatus used is insignificant compared to the cost of steam turbines. The existing walls of high pressure steam tubing now in power plants will have much greater capacity to recover heat when more water at lower pressures is forced through the tubes.

In a further modification of the present invention, the heating power of sunlight is used to produce water vapor, or vapor of an alternative liquid such as ethyl alcohol. The vapor is then utilized as above to displace liquid that drives a power producing device. Obviously, this embodiment would be located above ground in a position to receive sunlight. In order to maximize the amount of heat produced by the sunlight, the enclosure that holds the liquid and vapor is preferably made of glass. The conduits that lead to and from the enclosure are also preferably exposed to sunlight. To maximize the heat received by the conduits, they are preferably made of rollbonded sheets of metal having a serpentine path.

Figure 3:
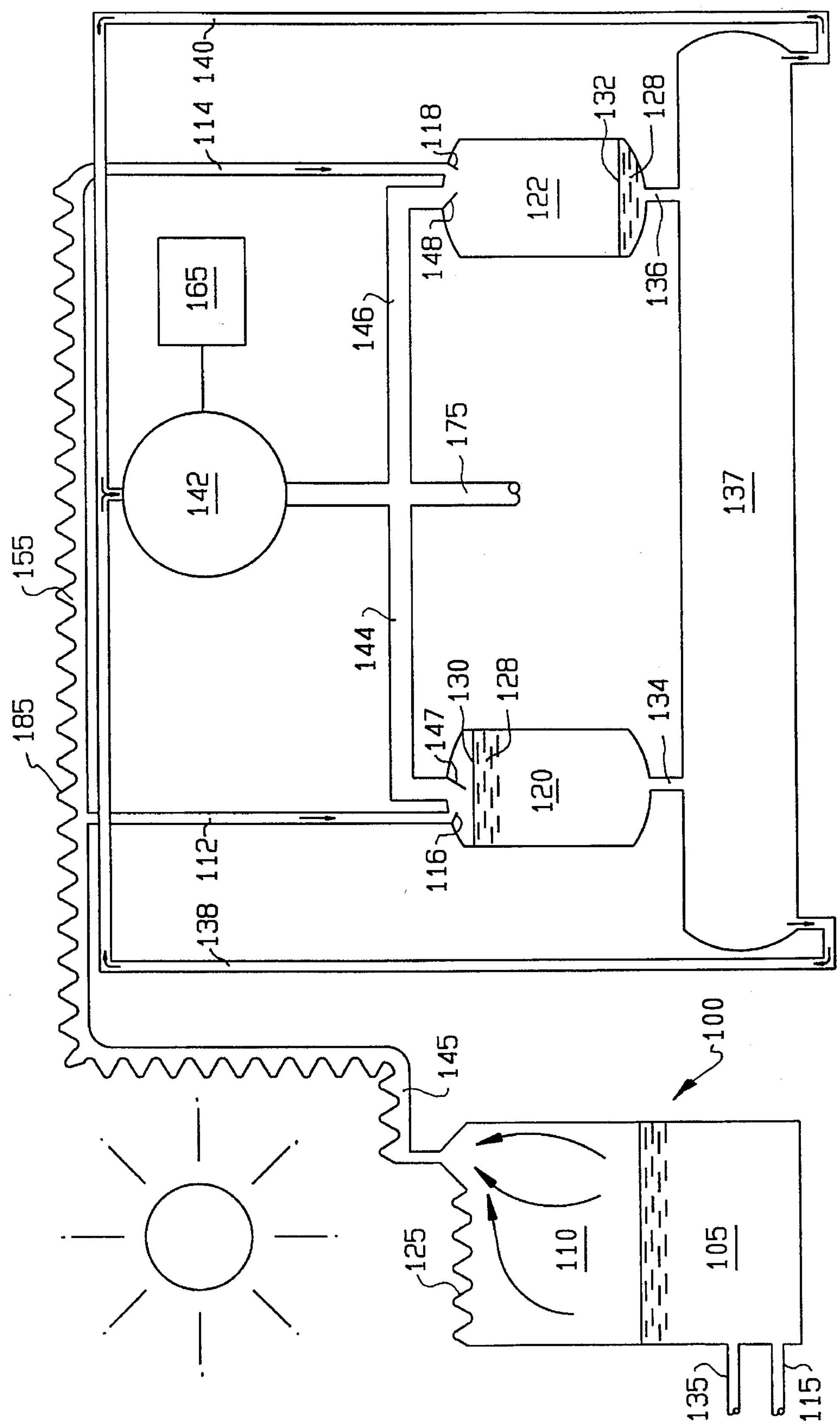
FIG. 3 is a cross-sectional view of another alternative embodiment of the process.

This embodiment is shown in FIG. 3. Where like components are present to those of FIG. 1, the numerals are the same except that 100 is added thereto.

A tank 100 made of a transparent material such as glass is provided with a liquid 105, such as water, and is exposed to sunlight to generate vapor 110. Water is provided to the tank through pipe 115.

The roof of tank 100 is provided with corrugations 125 which magnify the sunlight passing into the tank 100 to optimize vaporization of the water. If desired, a vaporizable substance, such as ethyl alcohol, can be added to tank 100 through pipe 135. This material increases the generation of the vapor and the efficiency of the process.

Vapor 110 is removed from the tank 100 by passing through conduits 145, 155, pipes 112, 114, valves 116, 118 and cylindrical chambers 120, 122. These chambers contain water 128 and floats 130, 132, which prevent the vapor from directly contacting the water. Operation of these chambers is the same as described above with regard to FIG. 1, except pelton wheel 142 can be used to produce direct current to charge one or more batteries 165. Water that has passed through pelton wheel 142 can be returned to chambers 120, 122 or to tank 100 via pipe 175.

Conduits 145, 155 are preferably made of a transparent material, such as glass, and are exposed to the sunlight to provide additional heating of the vapor. These conduits 145, 155 can include corrugations 185 which magnify the sunlight which passes therethrough to optimize heating of the vapor.

Figure 4:
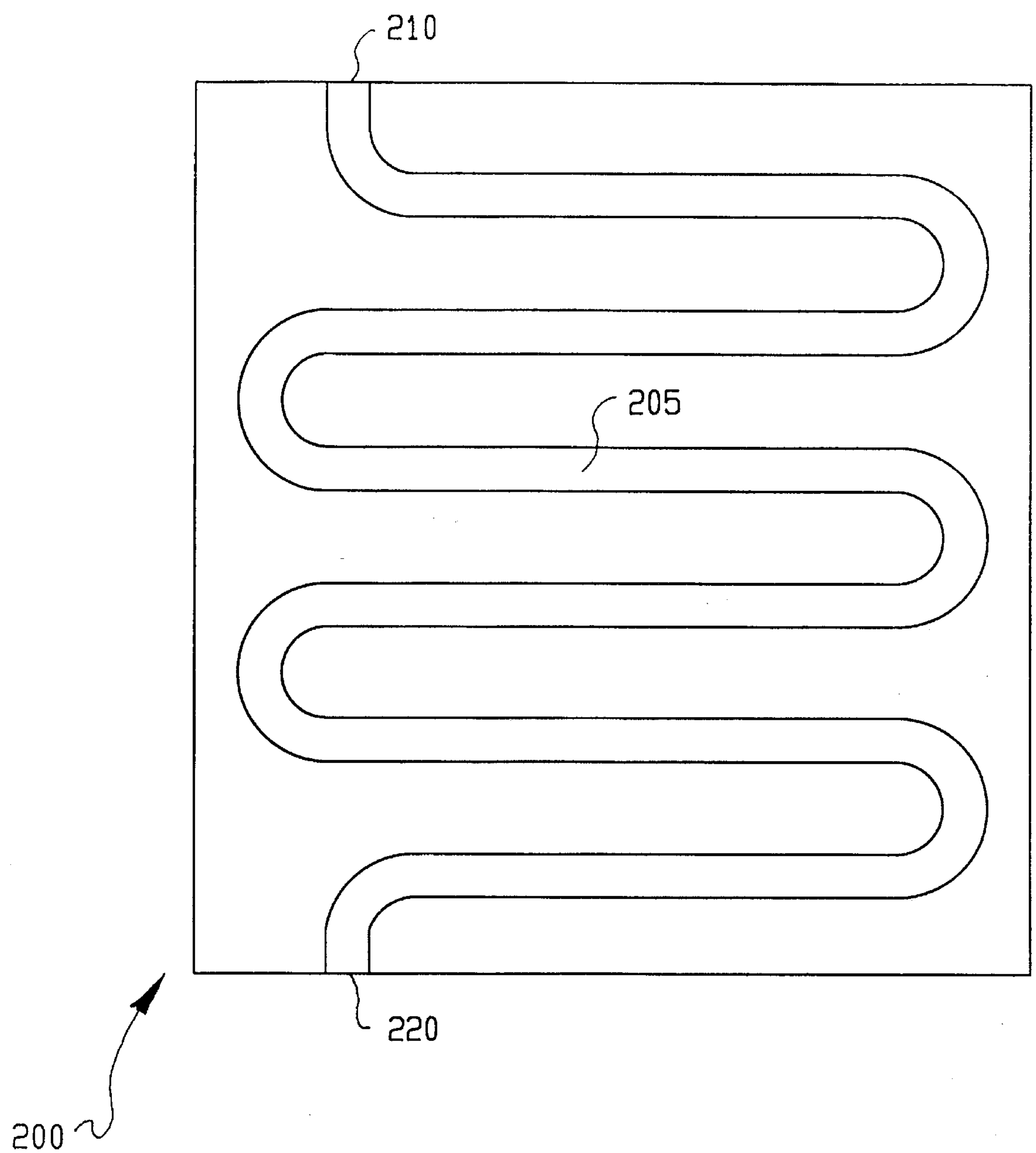
FIG. 4 is a cross-sectional view a roll bonded serpentine heat exchanger.

Alternatively, conduits 145, 155 can be provided in the form of rollbonded sheets of metal 200 having a serpentine path 205 for the vapor from inlet 210 to outlet 220. as illustrated in FIG. 4. This arrangement is useful for providing a longer path for the vapor to travel and more surface area for further heating of the vapor by the sunlight.

EXAMPLES

Example 1 Comparison of ideal and actual cycles for regenerative feedwater heating.

TABLE I

| Psia | lbs/hour | lbs/minute | temp (°F.) | lbs/in² absolute (Psi) |
|---|---|---|---|---|
| 510 | 75,876 | 1,265 | 458.7 | 510 |
| 148.6 | 46,862 | 781 | 369.5 | 486 |
| 34.8 | 29,525 | 492 | 275.0 | 34.8 |
| 5.5 | 31,483 | 525 | 177.6 | 5.47 |
| 1.0 | 378,312 | 6,305 | 79.1 | 1"Hg |

(Data taken from Mark's Standard Handbook for Mechanical Engineers, Baumeister Avallone Baumeister Eighth Edition, McGRAW-HILL BOOK COMPANY, 1951)

An examination of the above information shows that it is not attractive to direct 510 psia 458.7° F. steam into an apparatus to recover the energy in a hydraulic turbine rather than an existing steam turbine because high temperature places expansion and physical decomposition forces on the packing glands of the pumps despite that teflon packing glands can withstand 370° F.

The 148.6 psia 781 lbs/min 369.5° F. and 486 Psi steam might be continuous fed into first one end and then the other end of a reciprocating steam pump and would have a weight of 1/0.130 or 7 cu ft/lb.

In this Example, the design of the invention would include a reinforced concrete tube having a 10 ft inside diameter (5 ft in radius) in which a steel pipe is placed. This pipe has an outer diameter of 1 ft., a length of 85 ft, and is supported via long roller bearings at each end. A piston is used which is slightly less than 10 ft. diameter to provide room for piston ring grooves and nylon or graphite packing.

In this assembly, the piston reciprocates horizontally back and forth for a distance of 40 feet propelled by steam entering the steel pipe at top of one end of the tube, and then the other end. The steel pipe is supported outside of the ends of tube by roller bearings. The steel pipe projects into extra heavy, water-filled pipes at the ends. These pipes have check valves to prevent water from reversing its flow at the ends of the strokes.

The water is accumulated in a reservoir or tank under air pressure from which water continuously flows into hydro-electric generator with an efficiency of 80% to 90% compared to less than 50% for steam power plants and much lower capital and operating costs.

In this example, the 486 Psi steam exerts a pressure on piston of 3.1416×5×5=78.54 sq. ins.×486 lbs/sq in.=38,170 over the stroke length of 10 ft. for a total force of 381,700 ft lb.

Example 2 Exausting steam from a steam fired power plant steam with a pressure of 5.47 psia.

Even though 14.7 psia is air pressure at sea level, a reinforced concrete cylinder made of light weight vermiculite concrete retains little heat in its walls or the float on water which drives the pelton wheel. The 5.47 psia pressure is multiplied by ratio between a 10 ft. diameter cylinder and a 4 in. diameter jet driving the Pelton wheel is $$\frac{3.1416 \times 25 \times 144 \text{ in}}{3.1416 \times 4 \text{ ins}}$$

or 5.47×900=4923 psia at a height above sea level of 32.4 ft/14.7 4923×32.4/14.7=4923×2.2=10,841 ft. elevation. Use of an 8 inch diameter jet would reduce the elevation from 8×8/4×4−1/4×10,841=2710 ft., a more common elevation for hydroelectric power.

In the 60,000 KW plant (pg 9–57 of MARK'S 8th Ed. HANDBOOK), 31,843 lbs steam are extracted per hour at 5.47 psia and 29,525 at 34.8 psia totaling 61,008 or about ½ as much as the 75,876+46,862=122,738. Where thermal efficiency is 38%. Overall hydropower efficiency can be thus increased to 80% or more. Applying the present invention to this example by directing the ⅓ to hydropower apparatus with 2710 head shows 0.333×80%=26.6 compared to 0.666×38%=25.4 in the steam plant. So just converting ⅓ of the low pressure steam to hydropower brings the plant to 52% efficiency instead of 38%, which would be logical until high pressure turbo generators wear out at which time the entire power plant may be converted to low pressure steam by merely pumping more water through the boiler tubes to make 99% volumetric efficiency in plunger pumps. Of course, cooler boiler tubes result in better heat transfer by radiation from combustion gases.

I claim:

1. A process for producing hydro-electric power from vapor which comprises:

providing water in an enclosure;

exposing the enclosure to sunlight to heat the water and generate vapor;

removing the vapor from the enclosure;

providing a tank having first and second ends, and a plate which is capable of movement therein;

providing water in the tank between the first end and the plate;

passing the removed vapor into the tank to displace the plate toward the first end and to release water from the tank through an aperture which has a relatively small area compared to that of the tank; and directing the released water to drive a power producing device.

2. The process of claim 1 which further comprises adding a vaporizable substance to the water to increase the generation of the vapor.

3. The process of claim 2 in which the vaporizable substance is ethyl alcohol.

4. The process of claim 3 wherein the enclosure is made of a transparent material which allows entry of the sunlight.

5. The process of claim 1 which further comprises providing conduits to direct the vapor from the enclosure to the power producing device.

6. The process of claim 5 wherein the conduits are made of a transparent material and are exposed to sunlight for additional heating of the vapor.

7. The process of claim 5 which further comprises providing the conduits as rollbonded sheets of metal having a serpentine path.

8. The process of claim 4 wherein the enclosure is corrugated on its surface to magnify the sunlight which passes therethrough.

9. The process of claim 6 wherein the conduits include corrugations to magnify the sunlight which passes therethrough.

10. The process of claim 1 wherein the power producing device produces direct current for charging one or more batteries.

11. A process for producing hydroelectric power from vapor which comprises:

providing water in an enclosure exposing the enclosure to sunlight to heat the water and generate vapor;

removing the vapor from the enclosure;

passing the removed vapor into the top of a first vertical cylindrical tank which is full of water and which includes a lightweight float upon the water, said float having a size which is smaller than that of the tank so that water can pass around and beneath the float;

allowing the removed vapor to exert pressure on the float to displace and release water from an aperture in the tank, which aperture has a relatively small area compared to the horizontal cross-sectional area of the tank; and directing the released water to operate a hydraulic turbine to generate power.

12. The process of claim 11 which further comprises utilizing a second vertical cylindrical tank in the same manner as the first tank so that one tank can be refilled with water while the other is releasing water.

13. The process of claim 12 wherein the hydraulic turbine is located at a higher elevation than the tanks and which further comprises directing the water which exits the hydraulic turbine back to one of the tanks while the other tank is receiving steam and releasing water.

14. The process of claim 11 which further comprises directing the released water to a reservoir prior to directing the water to the hydraulic turbine.

15. The process of claim 1 which further comprises:

(a) providing a horizontal tank having first and second ends and a vertical plate therein which is mounted for reciprocal horizontal movement;

(b) providing water in the tank between the first end and the plate (c) passing the removed vapor into the tank to displace the plate toward the first end to release water from the tank; and (d) directing the released water to operate a hydraulic turbine to generate power.

16. The process of claim 15 wherein the hydraulic turbine comprises a pelton wheel, and the water is released from the tank through an aperture which has a relatively small area compared to that of the tank.

17. The process of claim 11 which further comprises passing additional removed vapor into the tank to displace the plate toward the second end of the tank to release condensed vapor therefrom, and repeating steps (b), (c), and (d) to further generate power.

18. The process of claim 11 which further comprises utilizing the removed vapor to drive a piston which pumps water into a hydroelectric generator.

19. The process of claim 18 which further comprises accumulating the pumped water in a reservoir before directing the water to the generator.

20. A process for generating hydro-electric power which comprises:

(a) providing a horizontal tank having first and second ends and a vertical plate which is mounted for reciprocal horizontal movement therein;

(b) providing water in the tank between the first end and the plate;

(c) passing fluids or vapors into the tank to displace the plate toward the first end to release water from the tank through an aperture which has a relatively small area compared to that of the tank; and (d) directing the released water to operate a hydraulic turbine to generate power.

* * * * *